United States Patent Office 3,487,727
Patented Jan. 6, 1970

3,487,727
CONTINUOUSLY VARIABLE SPEED VARIATORS
Bror Artur Gustafsson, Martensgatan 9,
Skurup, Sweden
Filed Nov. 29, 1967, Ser. No. 686,457
Claims priority, application Sweden, Nov. 30, 1966,
16,404/66
Int. Cl. F16h 15/50
U.S. Cl. 74—796                                     5 Claims

ABSTRACT OF THE DISCLOSURE

In a continuously variable speed variator of the frictional transmission type having a number of ball members rotating with an input shaft and rolling under spring bias on a pair of ball races, one of which is stationary with the variator casing and the other formed on a disc-like member joined for rotation with a hollow output shaft co-axially surrounding said input shaft, the improvement that the balls are carried from support members by cantilever bearing studs accommodated in a non-penetrating bore in the respective ball thereby leaving a substantially greater area of said balls inclusive the pole region available for transmission ratio variations in response to the tilting of said bearing studs relatively to the input shaft and also providing for the possibility of optionally incorporating in said variator a device strengthening the torque transfer capacity.

---

Figure 1:
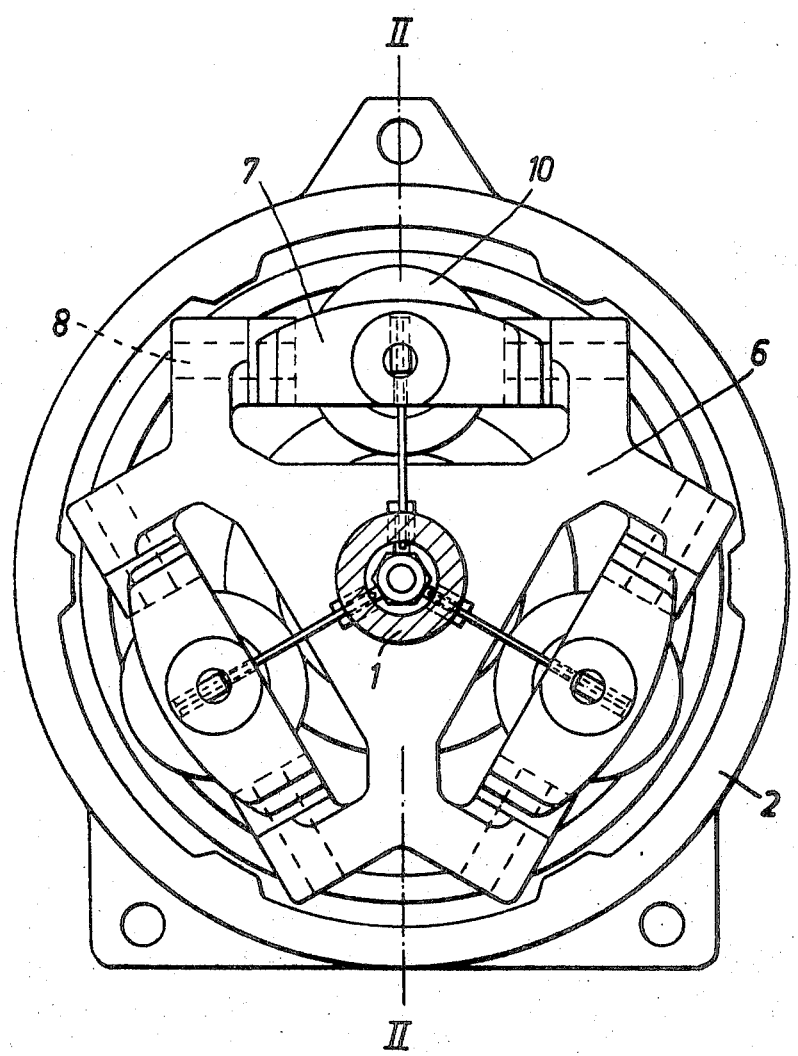

The present invention relates to continuously variable speed variators and particularly to a variator of the frictional transmission type and comprising spherical rolling members which are carried from an input shaft in a planetary manner by supporting means connected with said input shaft and adapted to roll along two races under a spring bias, one of said races being stationary and connected with the casing of the variator and the other race being formed on a disc-like member connected for rotation with an output shaft concentrically surrounding said input shaft.

Within many branches of the machine field it has been a problem for a long time to provide transmission ratios within very wide-spread limits for various types of power transmissions. For eliminating said difficulties, attempts have been made primarily to utilize various kinds of so-called variators with rolling bodies rolling along one stationary and one movable raceway. By way of example it can be referred to the well-known Kopp variator. Such variators, however, have several serious drawbacks in all their embodiments known, particularly that their torque transmission capacity has been limited as well as the transmission ratios which can be obtained.

Within certain branches of the machine field, such as in constructing spreading machines for artificial manure, salt and other granulate or pulverulent materials, there is a requirement for extremely wide variation possibilities for the machine operation, between e.g. 3 kg. and 300 kg. material spread per area unit, i.e. a hundredfold variation possibility. Hitherto it has been impossible to design such a suitable variator of continuously variable type and therefore it has been necessary to use toothed gearings of conventional type, however, requiring as much as 8–10 gearing steps. Of course such gearings cannot provide for as exact an adjustment as desired, which is a serious drawback.

However, according to the present invention it is suggested an embodiment of such a variator which is improved in principle and by which the above-mentioned disadvantages can be eliminated. The invention is substantially distinguished in that each rolling member is carried from its supporting means by a bearing stud which is accommodated in a central, non-penetrating bore in said rolling member and which, by an adjustment mechanism—preferably maneuvrable externally of said variator—is tiltable in a plane coplanar with said input shaft and on an axis, which is at right angles to said plane and passes through the center of the spherical rolling member, so as to allow a variation of the ratio between the radii of said rolling members on the respective rolling races in response to the tilting of said bearing studs relative to the input shaft and thus a variation of the transmission ratio of said variator.

The main object of the present invention thus is to provide for an elimination of disadvantages residing in variators hitherto known, particularly in that the range of adjustment has been widened owing to the fact that the spherical rolling members journalled in a cantilever fashion on bearing studs can be utilized also on their region closest to the poles of said members.

Another great advantage with the present variator of frictional transmission type is, however, that when used particularly for relatively low input speeds and a transmission ratio in the range between 1:0 and 1:1, inclusive, between the input and the output shafts, it gives a surprising and very advantageous possibility for being completed with a transmission torque amplifying device, preferably in form of a friction clutch. Said preferably preferred embodiment is then distinguished substantially in that said bearing studs for the rolling members are continuously tiltable between a position in parallelism with the input shaft and with the portion of the respective stud, which is disposed outside the rolling member, being remote from said disc-like member, the transmission ratio obtained being 1:0, and another position tilted 45° inwardly towards the input shaft, the transmission ratio obtained being 1:1, and in that said disc-like member, which carries the movable race and which is rotationally connected with the output shaft constitutes one of a pair of clutch pressure plates in a frictional clutch, between which plates is mounted at least one clutch disc rotationally connected with said input shaft, said second clutch plate of said pair being rotationally connected with the output shaft and also with said first clutch plate under the intermediation of a plurality of linkage means pivotally mounted at the periphery of said clutch plates and adapted to be drawn into an inclined position relatively to the plane of said plates when an entraining force on the first clutch plate occurs through the movement of said rolling movement and thus draw said plates towards each other while frictionally engaging the clutch disc or discs therebetween and create an entraining force thereon which is selfadjusting in response to the transmission ratio, to which the variator is set, and the input torque from the shaft so as to allow transfer of a torque which is substantially greater than that, which otherwise could be obtained with only the variator itself.

Another object of the present invention thus is to provide an embodiment of the variator of the kind referred to above, said variator being particularly well suited for use in machines of the above-stated kind such as sowing machines, spreading machines for artificial manure etc., where an extremely wide control range is desired in relatively slow-moving machines, wherein thus a substantially greater torque can be transferred than hitherto possible. The variator is used, namely, for transferring a smaller portion of the torque but to simultaneously create a control force for an automatically adjustable engagement force of the transmission torque strengthening friction clutch.

Figure 2:
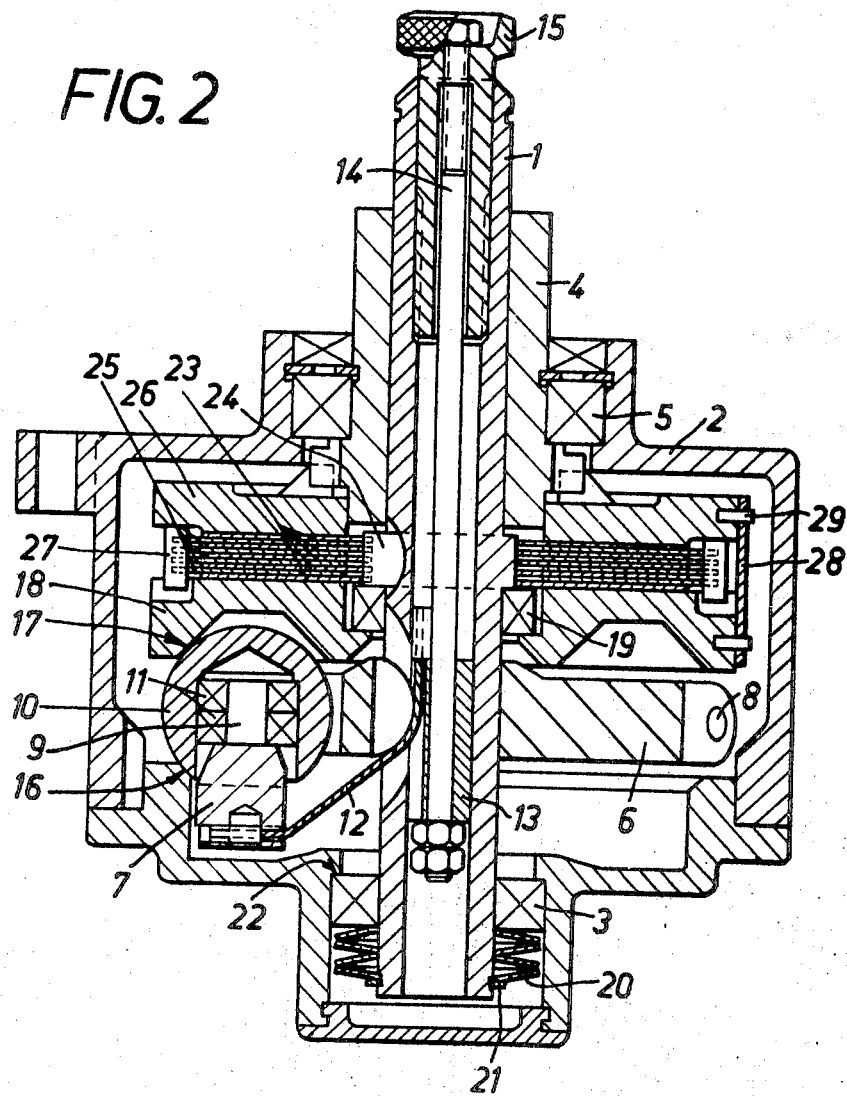
Figure 3:
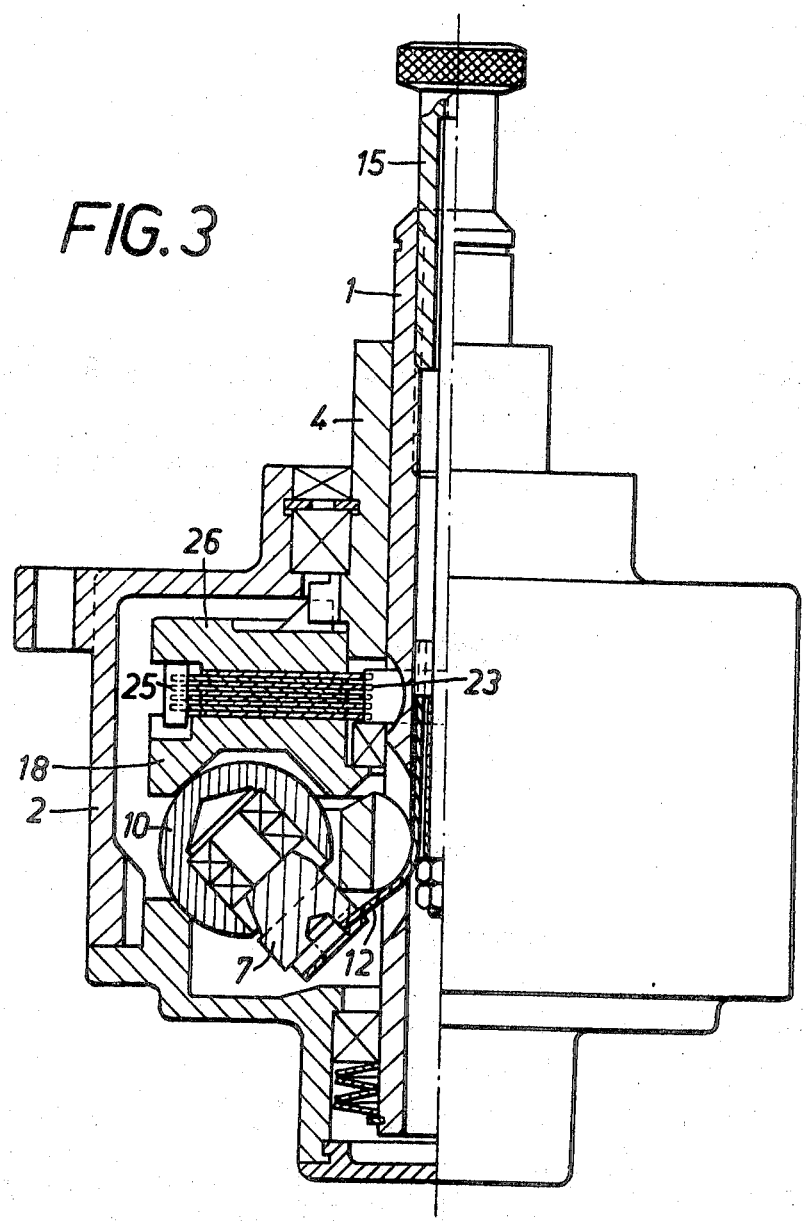
Figure 4:
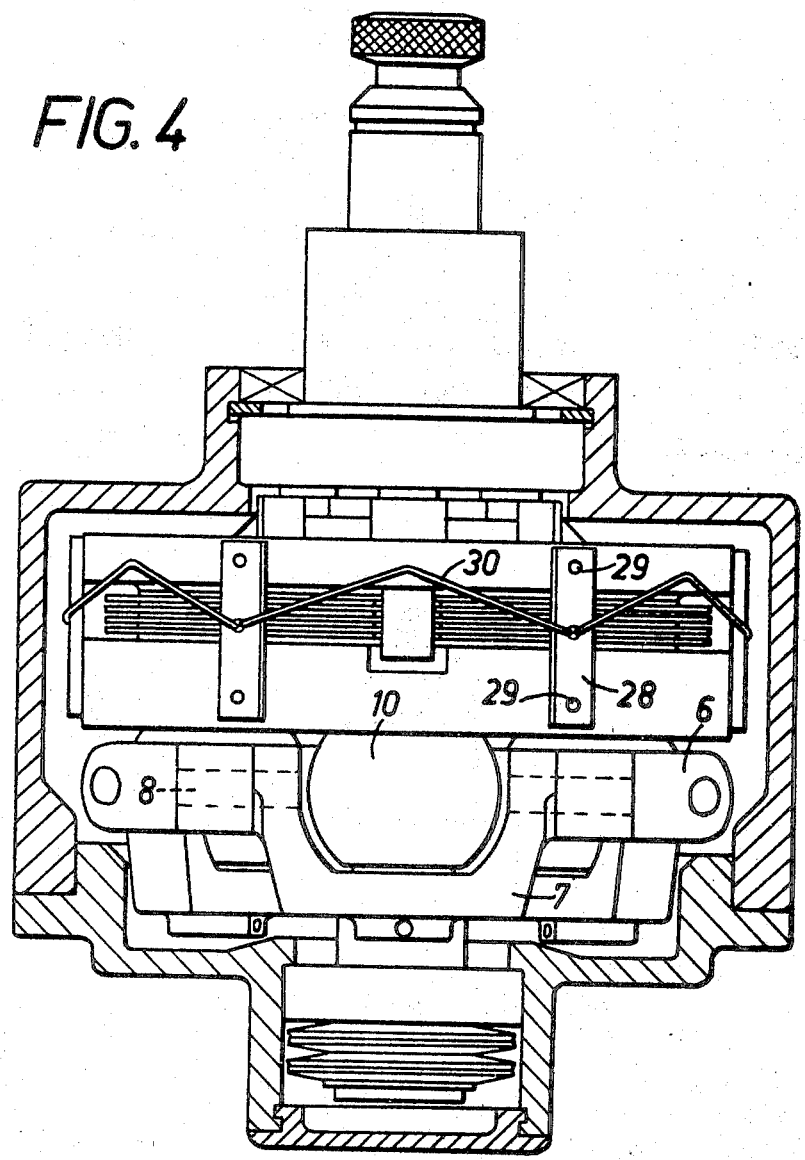
Figure 5:
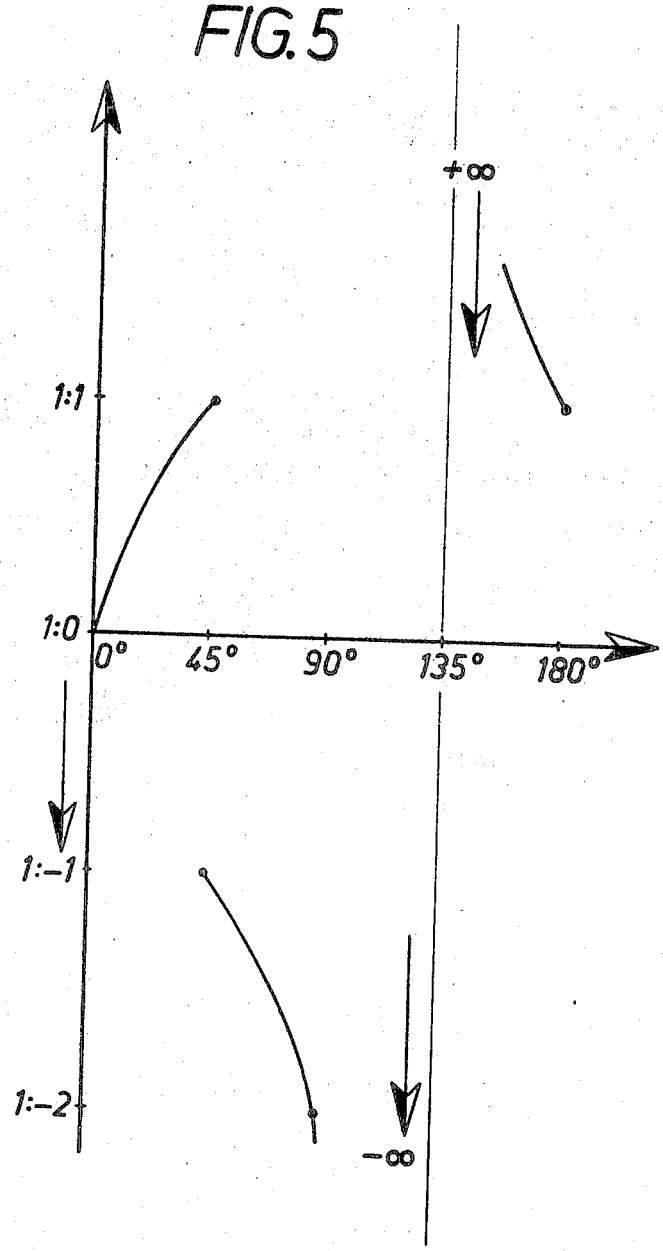
Figure 6:
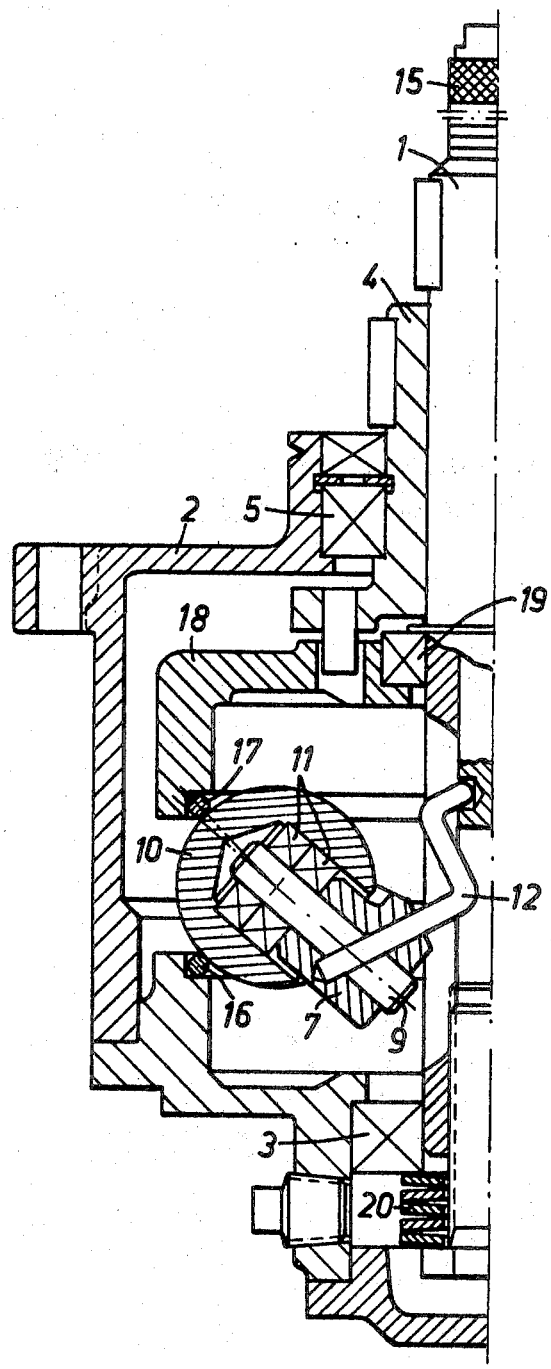

These and other objects of the invention will appear from the following description when read in conjunction with the accompanying drawings in which:

FIG. 1 is an elevational end view of the variator casing with the end wall broken away so as to expose the rolling member supporting means, FIG. 2 is a longitudinal section of the variator along the line II—II of FIG. 1, the rolling members being in a position with their bearing studs parallel to the driving input shaft, FIG. 3 is a view similar to FIG. 2 but with the rolling member supporting means being inclined to 45° inwardly to the axis of the input shaft, FIG. 4 is a partial section of the casing illustrating the internal details in elevational view, FIG. 5 is a principal diagram of the kinematic conditions for the operation of the present variator and the transmission ratio range which can be achieved, and FIG. 6 is a longitudinal section of a modified embodiment of the variator.

The preferred embodiment of the invention illustrated in FIGS. 1–4 is particularly adapted for relatively low speeds of the input shaft and for transmission ratios within the range 1:0–1:1 between the input and the output shaft. The variator thus comprises an input shaft 1 journalled in a casing 2 by a ball bearing 3 and in a tubular output shaft 4 which is journalled in its turn in a ball bearing 5. A disc 6 with fork-like notches is slidably but non-rotatably journalled on the shaft 1 and forms a carrier for the ball-shaped rolling members. In the fork-like notches on the disc 6, three U-curved supporting means 7 are pivotally journalled on two studs 8 each. On a bearing stud 9 secured to the supporting means 7 are spherical rolling members or balls 10 journalled on ball bearings 11. The axis of the studs 8 passes through the center of the balls 10. These supporting means 7 are pivotable from the position illustrated in FIG. 2 with the bearing studs 9 parallel to the shaft 1 to the position illustrated in FIG. 3, with the studs 9 inclined e.g. 45° in relation to the shaft 1. For this purpose the supporting means are connected to a slide member 13 by comparatively rigid wires 12 or similar connecting means, said sliding member being mounted on a rod 14 which is axially slidable and adjustable externally of the variator through an adjustment screw 15.

The rolling members or balls 10 are rolling along a race 16 integral with the casing 2 and along a race 17 disposed on a disc-like member 18 which is connected for rotation with the output shaft 4. In the present embodiment said disc-like member constitutes one of a pair of clutch pressure plates 18, 26 in a frictional clutch, and the disc 18 is pressed against the balls 10 by an axial bearing 19 which is seated on a shoulder on the input shaft 1. The pressing force is achieved by cup springs 20 mounted between a locking washer 21 on the shaft 1 and the ball bearing 3, which in its turn engages a shoulder 22 of the casing 2. Therefore, the balls 10 will run under spring bias along the races 16 and 17 when the shaft 1 is rotated. The races engage the balls on a distance of 45° from a plane transversal to the shaft 1 through the center of the ball.

When the supporting means 7 are in the position illustrated in FIG. 2, the balls will thus run with equal diameters along both the race 16 and the race 17. This means that the race 17 remains standing still in relation to the race 16, and no rotating action is transmitted to the disc 18. This corresponds to the transmission ratio 1:0. When the supporting means 7 are in the position illustrated in FIG. 3, the balls will run with their greatest diameter along the race 16, but simultaneously their center of rotation or the pole of the sphere will engage the race 17. By this, said race 17 will be entrained with the same speed as the speed of the shaft 1. This corresponds to the transmission ratio 1:1. In intermediate positions of the supporting means 7 the disc 18 will be obtain a speed between 0 and 1 in relation to the rotational speed of the shaft 1. Said ratio will be determined by the kinematical conditions such as will be further explained below.

Preferably the adjustment screw 15 is provided with such indicia means relatively to its pitch that 100 adjustment positions are obtained when adjusting the transmission ratio between 1:0 and 1:1. This can be obtained by providing the cylindrical surface of the screw with 10 peripheral scribed lines and 10 longitudinal scribed lines. By this it is achieved 100 adjustment points on the cylindrical surface of the adjustment screw. Of course, also intermediate positions of adjustment can be selected.

The above description concerns the speed-guiding portion of the variator. Depending upon with which force the cup spring 20 urges the ball races 16 and 17 against the balls 10 the disc 18 can transfer a greater or smaller torque. Anyhow, such transferred torque is relatively small and is mostly insufficient for use as a direct driving force. For this reason the variator according to the present embodiment of the invention is completed with a torque transfer strengthening device, particularly a frictional clutch.

In the embodiment of the variator according to the invention illustrated in FIGS. 1–4 of the drawings, said frictional clutch comprises one or more clutch discs 23, which are slidably but non-rotatably mounted on the shaft 1 by means of a wedge 24. One or more clutch discs 25 of another set are disposed alternately between said first-mentioned clutch discs 23 and are maintained in proper position non-rotatably in relation to the second clutch pressure plate 26 which is provided with an entraining member 27 which is accommodated in a notch in the edge of the clutch discs 25. The plate 26 is slidably but non-rotatably connected with the hollow output shaft 4 by a claw coupling. At their periphery, the discs 18 and 26 are interconnected by linkage means 28 which are movably mounted on studs 29 extending radially from the periphery of said discs. The linkage means are held kept in place by wire springs 30.

The lengths of said linkage means 28 are so selected that they do not urge the plates 18 and 26 and thus the discs 23, 25 against each other. When the plate 18 under the influence of the ball is rotated relatively to the plate 26 the linkage means 28 are caused to occupy an inclined position thereby reducing the distance between the plates 18 and 26 and urging the discs against each other, a torque being transferred from the discs 23 to the plate 26 and thus to the hollow output shaft 4.

This torque increases the more the inclination of the linkage means 28 increases till the plate 26 rotates with the same speed as the plate 18. Then a stable condition occurs under which the speed of the output shaft follows the speed of the input shaft in constant proportion to the position set of the balls 10 with a slip between the discs and the plates of the frictional clutch. In this connection it might also be pointed out that the present variator with its associated frictional clutch is single-acting, i.e. the clutch operates actively only in one direction of rotation, while for rotation in the opposite direction it operates as an automatic free-wheel. This is extremely advantageous in the application in sowing machines, spreading machines for artificial manure etc. for which this embodiment of the variator is particularly adapted.

A closer look upon the kinematic conditions for the function of the variator according to the invention reveals, however, that with a slight modification of the above-described embodiment of the inventive construction the variator also can serve for achieving other transmission ratios greater than 1:1. As is further evident from the principal diagram of FIG. 5 it is, namely, a particularly advantageous character of the variator according to the invention that also the pole areas of the spherical rolling members or balls 10 become accessible for being used. By this, use can be made of several advantageous characters connected therewith. The structural design illustrated in FIGS. 1–4 allows as described a transmission ratio between 1:0 and 1:1 when adjusting the bearing studs 9 from a position in parallelism with the input shaft 1 and to a position in 45° inclination to said shaft. This is illustrated by the leftmost curve portion in the diagram of FIG. 5. As soon as the angle of inclination of the bearing studs 9 exceeds 45° inwardly to the input shaft 1, a stepwise shifting of the operating conditions of the variator will be achieved, such as is evident from the succeeding second curve portion in the diagram. Immediately there occurs, namely, a reversal of the rotation of the variator, i.e. the input and the output shafts 1 and 4, respectively, will rotate in opposite directions and at the same time the transmission ratio will be achieved that from 1:—1 through 1:—2 varies to 1:—∞, the last-mentioned at least theoretical, for an angular position of 135° from the starting position in parallelism with the shaft 1. Passing this position of 135° there will be another stepwise shifting and the reversal ceases but the transmission ratio is still infinitely great, on the positive side, however. From said position of 135° and the transmission ratio +∞ said ratio then decreases back to 1:1 for a continued angular movement to a position of 180° in relation to the starting position.

A modified variator for utilizing the advantageous characters of the variator so as to achieve transmission ratios greater than 1:1 according to the diagram of FIG. 5 last mentioned, is illustrated in FIG. 6. In said figure, the variator is in a position where the bearing studs 9 occupy an inclined position of about 50° from the position of FIG. 2 in parallelism with the input shaft 1. In this case there occurs a reversal of the movement of the variator, i.e. the output shaft 4 will rotate in opposite direction to the input shaft 1, and the transmission ratio is slightly greater than 1:—1. It will also be noted that said embodiment for transmission ratios greater than 1:1 with and without reversal does not longer require any transmission for strengthening device. In the present embodiment the race 17 for the balls 10 therefore is made on a disc-like body 18 which is directly connected with the output shaft 4 for rotation therewith.

It is also to be noted that strictly theoretical the above-mentioned adjustment positions of the bearing studs 9 of the rolling member to the angular position of 135° allow the achievement of transmission ratios asymptotically increasing towards the infinity. Of course, this is only of pure theoretical interest, since for very high transmission ratios the torque transferred will be extremely small and a slip will occur automatically in the variator. For limited transmission ratios greater than 1:1 and with reversal the last-mentioned modified embodiment of the variator according to the invention will find many advantageous applications, such as for feeding movements in various machine tools etc.

The embodiment of the invention, however, offering the most apparent advantages in relation to the variators hitherto known is the version illustrated in FIGS. 1–4 adapted for transmission ratios within the range of 1:0 and 1:1. In said version, it is possible, namely, to utilize a frictional clutch as a torque transfer strengthening device in such variators of continuously variable rolling member type, and the relatively small torque derived from the rolling members is thereby utilized for creating a control force on the clutch which in turn transfers a much greater torque.

I claim:
1. A speed variator of the frictional transmission type comprising:
   (a) an input shaft rotatable about an axis;
   (b) an output shaft;
   (c) first means defining a stationary race surface extending circumferentially about the axis of said input shaft;
   (d) means for transferring a driving force to said output shaft including a member defining a second race surface extending circumferentially about said input shaft in opposed spaced relation from said first race surface, including mounting means for mounting said force transfer means for rotation about the axis of said input shaft;
   (e) a plurality of spherical rolling members carried by said input shaft including means for spring biasing said spherical rolling members into contacting relation with said first and second race surfaces, said spherical rolling members being disposed at radial positions about said input shaft and driven by said input shaft about the axis of rotation of said input shaft in contacting relation with said first and second race surfaces, each of said spherical rolling members defining a bore therein said bores terminating internally of said rolling members;
   (f) means for adjustably connecting each of said rolling members to said input shaft including a support means connected to said shaft and variable mounting means for mounting said rolling member to said support means, said variable mounting means including means carried thereby and received in the respective bores of said rolling members for rollingly connecting said spherical rolling members to said variable mounting means for rolling movement about an axis of rotation passing through the center of each of said spherical rolling members, said respective axes of said spherical rolling members extending through a pole portion defined on each of said spherical rolling members opposite said bores;
   (g) adjustment means for selectively varying the position of said variable mounting means to selectively vary the contact zones of said rolling members with said first and second race surfaces and the orientation of the axis of rotation of said spherical members to the axis of rotation of said force transfer means so that when said rolling members are in a first position wherein the axes of rotation of spherical members and said force transfer means are parallel each of said spherical rolling members rolls along said second race surface thereby imparting no driving force to said force transfer means and when the respective axes of rotation of the spherical members and said force transfer members are angularly disposed so that the poles of said spherical rolling members engage said second race surface said force transfer means is rotated by the frictional engagement of the force transfer means and said spherical rolling members, the frictional engagement and thus the speed of the output shaft being dependent upon the angular orientation of the axes of rotation of the spherical rolling members to the axis of rotation of said force transfer means and said speed being continuously variable.

2. A speed variator of the frictional type as recited in claim 1 wherein said means for adjustably connecting said spherical rolling members to said input shaft further includes a plurality of yokes and means for swingably mounting said yokes to said support means for swinging movement in a radial direction relative to the axis of rotation of said input shaft with said connecting means received in the bores of the respective spherical rolling members carried by said respective yokes and wherein said adjustment means is connected to said yokes for swinging movement of said yokes through a desired arc to selectively set the orientation of the respective axes of rotation of the spherical rolling members relative to the axis of rotation of the force transfer means.

3. A speed variator of the frictional transmission type as recited in claim 1 wherein said force transfer means includes a first clutch pressure plate with means for rotatably mounting said first pressure plate coaxially with said input shaft and wherein a second clutch pressure plate is connected in axially sliding relation to said output shaft for rotation with said output shaft, said second clutch pressure plate being positioned in opposed, variably spaced relation to said first pressure plate, said variator further including at least one clutch disc axially slidably connected to said input shaft for rotation therewith and positioned in the space between said pressure plates, said input and output shafts being coaxial, linkage means mounted to said clutch plates for rotating said second pressure plate upon rotation of said first pressure plate and for drawing said second pressure plate toward said first pressure plate to clampingly engage said clutch disc therebetween when the movement of said first clutch plate is effected by said rolling members, said linkage means being responsive to the speed of said first pressure plate whereby said linkage means increases the clamping engagement on said clutch disc as the speed of said first pressure plate increases under the influence of the spherical rolling members.

4. A speed variator of the frictional transmission type as recited in claim 3 wherein a plurality of first clutch discs are axially slidably carried by said input shaft for rotation therewith and further including a plurality of second clutch discs connected to said second pressure plate for rotation therewith coaxially of said shafts and positioned alternately of said first pressure plates.

5. A speed variator of the frictional transmission type as recited in claim 2 wherein said input shaft defines a bore axially thereof and wherein said means for adjusting the position of the axis of rotation of the spherical rolling members relative to the axis of rotation of the force transfer means includes an axially movable rod member received in said axial bore in the input shaft and means connecting said rod to said swingable yoke and further including means for selectively moving said rod axially of said bore in said input shaft to displace said yoke connecting means and rotate said yoke through an arc related to the amount of said displacement.

References Cited

UNITED STATES PATENTS

| 1,775,201 | 9/1930 | Jacobsen | 74—796 XR |
| 2,177,946 | 10/1939 | Pollard | 74—690 |
| 2,682,776 | 6/1954 | Morgan | 74—690 XR |
| 3,283,523 | 8/1966 | Nash | 74—690 XR |
| 3,289,496 | 12/1966 | Hoover | 74—689 |

FOREIGN PATENTS 263,493  4/1927  Great Britain.

ARTHUR T. McKEON, Primary Examiner